(12) United States Patent
Kim (10) Patent No.: US 11,023,916 B2
(45) Date of Patent: Jun. 1, 2021

(54) BONUS ACCUMULATION SYSTEM, BONUS ACCUMULATION METHOD, AND IOD-NFC TERMINAL DEVICE THEREFOR

(71) Applicant: Seong-Kil Kim, Seoul (KR)

(72) Inventor: Seong-Kil Kim, Seoul (KR)

( * ) Notice: Subject to any disclaimer, the term of this patent is extended or adjusted under 35 U.S.C. 154(b) by 200 days.

(21) Appl. No.: 15/521,800

(22) PCT Filed: Nov. 2, 2015

(86) PCT No.: PCT/KR2015/011667
§ 371 (c)(1),
(2) Date: Apr. 25, 2017

(87) PCT Pub. No.: WO2016/068687
PCT Pub. Date: May 6, 2016

(65) Prior Publication Data
US 2017/0316441 A1  Nov. 2, 2017

(30) Foreign Application Priority Data
Oct. 31, 2014 (KR) ........................ 10-2014-0150123

(51) Int. Cl.
*G06Q 30/02* (2012.01)
*G06Q 20/38* (2012.01)
(Continued)

(52) U.S. Cl.
CPC ......... *G06Q 30/0226* (2013.01); *G06Q 20/20* (2013.01); *G06Q 20/202* (2013.01);
(Continued)

(58) Field of Classification Search
CPC .. G06Q 30/0226; G06Q 20/20; G06Q 20/202; G06Q 20/3255; G06Q 20/3278; G06Q 30/0238; G07G 1/0018
See application file for complete search history.

(56) References Cited

U.S. PATENT DOCUMENTS

| 8,775,243 B2 * | 7/2014 | Gillenson | G06Q 30/02 705/14.1 |
| 2012/0078783 A1 * | 3/2012 | Park | G06Q 20/105 705/41 |

(Continued)

FOREIGN PATENT DOCUMENTS

| KR | 10-2004-0040253 A | 5/2004 |
| KR | 10-2007-0059581 A | 6/2007 |

(Continued)

OTHER PUBLICATIONS

White Paper:Mobile Commerce in REtail: Loyalty and Couponing; Jan. 2014, GSMA Digital Commerce, pp. 1-40 (Year: 2014).*

(Continued)

*Primary Examiner* — James M Detweiler
(74) *Attorney, Agent, or Firm* — Studebaker & Brackett PC (57) ABSTRACT

The present invention provides a bonus accumulation system comprising: a payment terminal device which is installed in a business branch and transmits/receives, to/from a payment approval company, a commercial transaction approval request and commercial transaction approval confirmation; a near field communication (NFC) terminal device having an NFC function, which directly receives final payment approval data from the payment terminal device, using a serial communication module of the payment terminal device, and calculates bonus data; and a user terminal device for receiving the calculated bonus data from the NFC terminal device through NFC, and sending a request for an approval of the received bonus data to a bonus server and receiving the approval through a mobile communication network.

12 Claims, 4 Drawing Sheets

(51) Int. Cl.
  *G06Q 20/34* (2012.01)
  *G06Q 20/20* (2012.01)
  *G06Q 20/32* (2012.01)
  *G07G 1/00* (2006.01)

(52) U.S. Cl.
  CPC ..... *G06Q 20/3255* (2013.01); *G06Q 20/3278* (2013.01); *G06Q 20/343* (2013.01); *G06Q 20/387* (2013.01); *G06Q 30/0238* (2013.01); *G07G 1/0018* (2013.01)

(56) References Cited

U.S. PATENT DOCUMENTS

| | | | | |
|---|---|---|---|---|
| 2012/0296720 A1* | 11/2012 | Pirillo | ............... | G06Q 30/0239 705/14.17 |
| 2013/0048717 A1* | 2/2013 | Brendell | ............... | G06Q 20/352 235/380 |
| 2013/0304553 A1* | 11/2013 | Hertel | ............... | G06Q 30/02 705/14.23 |
| 2014/0129357 A1* | 5/2014 | Goodwin | ............... | G06Q 30/02 705/16 |
| 2014/0195425 A1* | 7/2014 | Campos | ............... | G06Q 20/20 705/41 |
| 2014/0222545 A1* | 8/2014 | Hajji | ............... | G06Q 20/202 705/14.38 |
| 2014/0257961 A1* | 9/2014 | Zimmermann | ............... | G06Q 30/0231 705/14.31 |
| 2014/0297381 A1* | 10/2014 | Park | ............... | G06Q 20/322 705/14.23 |
| 2014/0351071 A1* | 11/2014 | Hong | ............... | G06Q 20/204 705/20 |
| 2015/0120424 A1* | 4/2015 | Park | ............... | G06Q 30/0226 705/14.27 |
| 2015/0187177 A1* | 7/2015 | Warner | ............... | G07F 17/3244 463/25 |
| 2015/0235256 A1* | 8/2015 | Barsoum | ............... | G06Q 20/02 705/14.33 |
| 2019/0080307 A1* | 3/2019 | Katzin | ............... | G06Q 20/027 |
| 2019/0114605 A1* | 4/2019 | Valencia | ............... | G06Q 20/20 |

FOREIGN PATENT DOCUMENTS

| | | | |
|---|---|---|---|
| KR | 10-2011-0100172 A | 9/2011 | |
| KR | 10-2012-0105587 A | 9/2012 | |
| KR | 10-2012-0117970 A | 10/2012 | |
| KR | 10-2012-0137627 A | 12/2012 | |
| KR | 10-2013-0117576 A | 10/2013 | |
| KR | 10-2014-0120259 A | 10/2014 | |
| WO | WO-2013082190 A1 * | 6/2013 | ......... G06Q 20/4016 |

OTHER PUBLICATIONS

"Mobile Near Field Communications (NFC) 'tap 'n Go' Keep it Secure & Private" (Cavoukian, Ann; Information and Privacy Commissioner, Ontario, Canada/Privacy by Design—Archived by the Ontario Legislative Library: Nov. 28, 2011) (Year: 2011).*

International Search Report issued in PCT/KR2015/011667; dated Mar. 21, 2016.

Written Opinion issued in PCT/KR2015/011667; dated Mar. 21, 2016.

An Office Action issued by the Korean Patent Office dated Jan. 20, 2017, which corresponds to Korean Patent Application No. 10-2015-0153462.

* cited by examiner

BONUS ACCUMULATION SYSTEM, BONUS ACCUMULATION METHOD, AND IOD-NFC TERMINAL DEVICE THEREFOR

TECHNICAL FIELD

The present invention relates to a bonus accumulation system, a bonus accumulation method, and an NFC terminal therefor, and more particularly, to a reverse bonus accumulation system, a bonus accumulation method, and an IoD-NFC terminal therefor, in which a user terminal is capable of being approved with a bonus from a bonus server after automatically calculating the bonus in a near field communication (NFC) terminal based on Internet of Data (IoD) acquired by applying Internet of Things (IoT) of a business branch without going by way of a value added network (VAN) or using an association network of a direct admission and payment company and directly transmitting the calculated bonus to the user terminal.

BACKGROUND ART

All existing bonus accumulation and approval systems include an alliance scheme processed simultaneously with a payment function. When an accumulation approval request is executed in a payment terminal of a business branch by using a means such as a bonus card, a bonus application, or a user terminal device including near field communication (NFC), which includes a bonus accumulation function, the accumulation approval request is provided to a bonus company via a point of sale (POS) system, a VAN communication network, and a final payment approval company. The bonus accumulation and approval system is a scheme in which the bonus company performs the approval and calculates a bonus according to a bonus accumulation criterion of the corresponding business branch embedded in a server of the bonus company based on a received payment approval amount and the approval information and the calculated bonus information are transmitted to the payment terminal of the business branch via the VAN, the POS network, or a final payment approval company again to be finally verified by a user.

As described above, a bonus management system in the related art adopts a scheme in which the bonus company directly manages the bonus generated when a consumer performs a commercial transaction with the business branch in every day life. To this end, the bonus company needs to directly construct an autonomous VAN and point of sale (POS) system by investing astronomical cost and develop and supply a terminal is autonomously developed thereby. In particular, in order to differentially apply the bonus in proportion to the payment amount or similarly integratedly manage the bonus in multiple business branches, the bonus company need to particularly security-associate data with and pass the data through the POS terminal and associated communication networks by one-to-one scheme in advance. Further, when the bonus company does not associate and construct all of the respective POS systems and VAN communication networks installed in the multiple business branches, the VAN communication network designed in the payment terminal of a franchised business branch and the VAN communication associated with the bonus company do not match each other in most cases, and as a result, an expensive POS payment terminal needs to be unavoidably replaced or a franchise relationship may not be established. Further, when the bonus company associates and constructs or cooperates the VAN communication network and the POS system, there is a large limit such as an entry barrier, or the like and it is impossible or difficult to realize profits due to high cost and efforts required for constructing and maintaining the communication network with 16 or more domestic VAN companies or 30 or more POS companies, using the network, etc., and as a result, there is a problem in extension of business.

Moreover, a bonus accumulation scheme using the bonus card, the bonus application, and a general NFC scheme (hereinafter, referred to as a bonus card, etc.) using the scheme in the related art has a disadvantage in that each of both the business branch and the consumer should perform a credit card payment procedure and a bonus accumulation procedure. Besides, there is also a disadvantage that an application installed in a user terminal needs to be driven and thereafter, a log-in state needs to be maintained in order to save the bonus by using the application. Further, in all of the bonus accumulation schemes using the bonus card, etc., inconvenience that individual cards are particularly gotten and possessed through the business branch, etc. or the bonus application is downloaded to maintain the log-in state before accumulating and using all bonuses needs to be accepted and mental stress that using or accumulating the bonus needs to be requested before payment while actually using the bonus is also very large. In addition, the business branch should accept inconvenience of querying whether the consumer possesses the bonus card, etc. to the consumer and advising the consumer to use the bonus card and there is a high possibility that the business branch will receive a complaint of the consumer on the spot or later when the business branch evades handling of the bonus card or a failure in using the bonus card occurs to cause an impediment in using and extending the bonus.

DETAILED DESCRIPTION OF THE INVENTION

Technical Problem

The present invention is contrived to solve the problem, an object of the present invention is to provide a bonus accumulation system and method using an IoD based near field communication (IoD-NFC) terminal device of a business branch which is an IoD concept based new NFC device without passing through a VAN communication network or a POS system and a server (hereinafter, referred to as a bonus server) of a bonus service company.

Another object of the present invention is to provide a bonus accumulation system and method, which can reduce cost and increase profitability because fee and data communication cost for using multiple VAN communication networks and POS systems, which occupy most of the prime cost.

Yet another object of the present invention is to provide a bonus accumulation system and method, in which a user can first verify bonus data and receive an approval of the bonus data from a bonus server as a user terminal device requests the approval and receives the approval by transmitting the bonus data received from an IoD-NFC terminal device to the bonus server.

Still another object of the present invention is to provide a reverse bonus accumulation system and method in which an IoD-NFC terminal directly transmits bonus data provided from a bonus server in the related art from a business branch to the user terminal device and the user terminal device requests the approval of the bonus data to the bonus server.

Objects which can be obtained in the present invention are not limited to the aforementioned objects and other unmentioned objects will be clearly understood by those skilled in the art from the following description.

Technical Solution

According to an embodiment of the present invention, a bonus accumulation system includes: a payment terminal device which is installed in a business branch and transmits/receives, to/from a payment approval company, a commercial transaction approval request and commercial transaction approval confirmation; a near field communication (NFC) terminal device having an NFC function, which directly receives final payment approval data from the payment terminal device, using a serial communication module installed in the payment terminal device, and calculates bonus data; and a user terminal device which receives the calculated bonus data from the NFC terminal device through NFC, and sends a request for an approval of the bonus data received by a bonus server and receives the approval through a mobile communication network.

The NFC terminal device may calculate the bonus data from the received final payment approval data based on at least one predetermined condition.

The NFC terminal device may identify user information of the user terminal device and the identified user information may include an identification number of the user terminal device, whether a bonus application is installed in the user terminal device, and whether the bonus application is in a log-in state, and the NFC terminal device may calculate the bonus data based on only the identification number of the user terminal device when the user does not subscribe to or log in a bonus server, and calculate the bonus data based on the identification number of the user terminal device and the user information stored in the bonus server and automatically aggregate the calculated bonus data with the data accumulated in the bonus server when the user subscribes to and logs on the bonus server.

An approval request of the bonus data may include the bonus data, the identification number of the user terminal device, the business branch information, and a security authentication key and a security token of the bonus data.

The NFC terminal device may include at least one of a payment terminal device integrated component configured integratedly with the payment terminal device, a sign-pad integrated component configured integratedly with a sign-pad connected with the payment terminal device, a peripheral device integrated component configured integratedly with a peripheral device other than the payment terminal device and the sign-pad, and a separate terminal device component configured as a separate device from the payment terminal device and the sign-pad.

The user terminal device may include an application (bonus application) dedicated to the bonus server, and in the case where the user intends to use a bonus in the business branch through the user terminal device, when short-distance contacting the IoD-NFC terminal device while logging-in the bonus application, the payment terminal device may request and confirm an approval of exchanging and using the bonus to the bonus company via an added value communication network in the same manner as a method for transmitting/receiving an approval request and an approval confirmation of a commercial transaction to a payment approval company through the added value communication network.

The NFC terminal device may further include an alarm module that announces that the bonus data is transmitted or announces a calculation amount of the bonus data through an acoustic device or a monitor after transmitting the bonus data.

The bonus data may include at least one selected from a group including points, mileages, electronic coupons, electronic stamps, electronic lotteries, electronic appreciation coupons, and event winning tickets.

The user terminal device may request the approval of the bonus data to the bonus server through a bonus server dedicated application, SMS, MMS, a messenger, or a messenger application.

The bonus server may receive a request for the approval of the bonus data from the user terminal device and approve the bonus data and aggregate, deduct, and store the bonus data.

According to another embodiment of the present invention, a method for accumulating a bonus in an NFC terminal device that is installed in a business branch and communicates with a payment terminal device through a serial communication module of the payment terminal device and communicates with a user terminal device through near field communication (NFC), includes: receiving final payment approval data from the payment terminal device by using the serial communication; identifying user identification information from the user terminal device; calculating bonus data from the final payment approval data and the user identification information based on predetermined bonus type and application criteria; and transmitting the calculated bonus data to the user terminal device by using the NFC.

According to yet another embodiment of the present invention, an NFC terminal device that is installed in a business branch and communicates with a payment terminal device through a serial communication module of the payment terminal device and communicates with a user terminal device through near field communication, includes: a data transmitting/receiving unit which receives final payment approval data from the payment terminal device by using the serial communication; a user identifying unit which identifies user identification information from the user terminal device; a bonus setting unit which stores predetermined bonus type and application criteria; a bonus calculating unit which calculates bonus data based on the final payment approval data received by the data transmitting/receiving unit, the user identification information identified by the user identifying unit, and the predetermined bonus type and application criteria received from the bonus setting unit; and a bonus storing and transmitting/receiving unit which stores the bonus data calculated from the bonus calculating unit and transmits the bonus data to the user terminal device.

Advantageous Effects

According to an embodiment of the present invention, provided are a bonus accumulation system and a bonus accumulation method using an IoD based near field communication (NFC) terminal device of a business branch, which is an IoD concept based new NFC device without using a VAN communication network or an association network with a POS system and a bonus server or a direct payment approval company, and as a result, cost and a procedure for constructing and maintaining a bonus communication network are not required, thereby reducing time and cost.

Further, according to the present invention, a fee and data communication cost for using multiple VAN communication networks and POS systems which occupy most of the prime cost can be reduced in a bonus company to contribute to reducing cost and increasing profitability.

In addition, according to the present invention, in order to use a bonus system, the bonus accumulation system and the bonus accumulation method need not be held by an influence of multiple VAN companies or POS companies, and as a result, autonomy of a service and diversity of marketing can be secured.

Further, according to the present invention, a user may not possess and present a bonus card or application and since prior installation and log-in of a mobile application is not required, user convenience can be enhanced. Moreover, since a bonus can be saved only by presentation (touch) of a user terminal device in the business branch, a separate accumulation procedure is not required in addition to a payment procedure and a separate accumulation request may not be required to the business branch, thereby increasing a user use probability.

Further, according to the present invention, the business branch can give a bonus benefit by a convenient method to influence securing a customer and increasing sales. In particular, since an accumulation card or not is verified to the user before payment or accumulation need not be recommended, user inconvenience and an increase in payment time can be minimized. Last, since the IoD-NFC terminal device is just installed by using serial communication embedded in a payment terminal device in the related art, a separate facility is not required in addition to low installation cost of the IoD-NFC terminal device, thereby avoiding an increase in initial cost.

BEST MODE

The advantages and features of the present invention, and methods for accomplishing these will become obvious by referring to embodiments to be described below in detail along with the accompanying drawings.

However, the present invention is not limited to the embodiments set forth below, and may be embodied in various different forms. The present embodiments are just for rendering the disclosure of the present invention complete and are set forth to provide a complete understanding of the scope of the invention to a person with ordinary skill in the technical field to which the present invention pertains, and the present invention will only be defined by the scope of the claims.

In describing the embodiment of the present invention, a detailed description of known function or constitutions will be omitted when it is judged that the detailed description may unnecessarily make the gist of the present invention unclear. In addition, terms to be described below as terms which are defined in consideration of functions in the embodiment of the present invention may vary depending on the intention or usual practice of a user or an operator. Accordingly, the terms need to be defined based on contents throughout this specification.

Hereinafter, embodiments of the present invention will be described with reference to the accompanying drawings.

Figure 1:
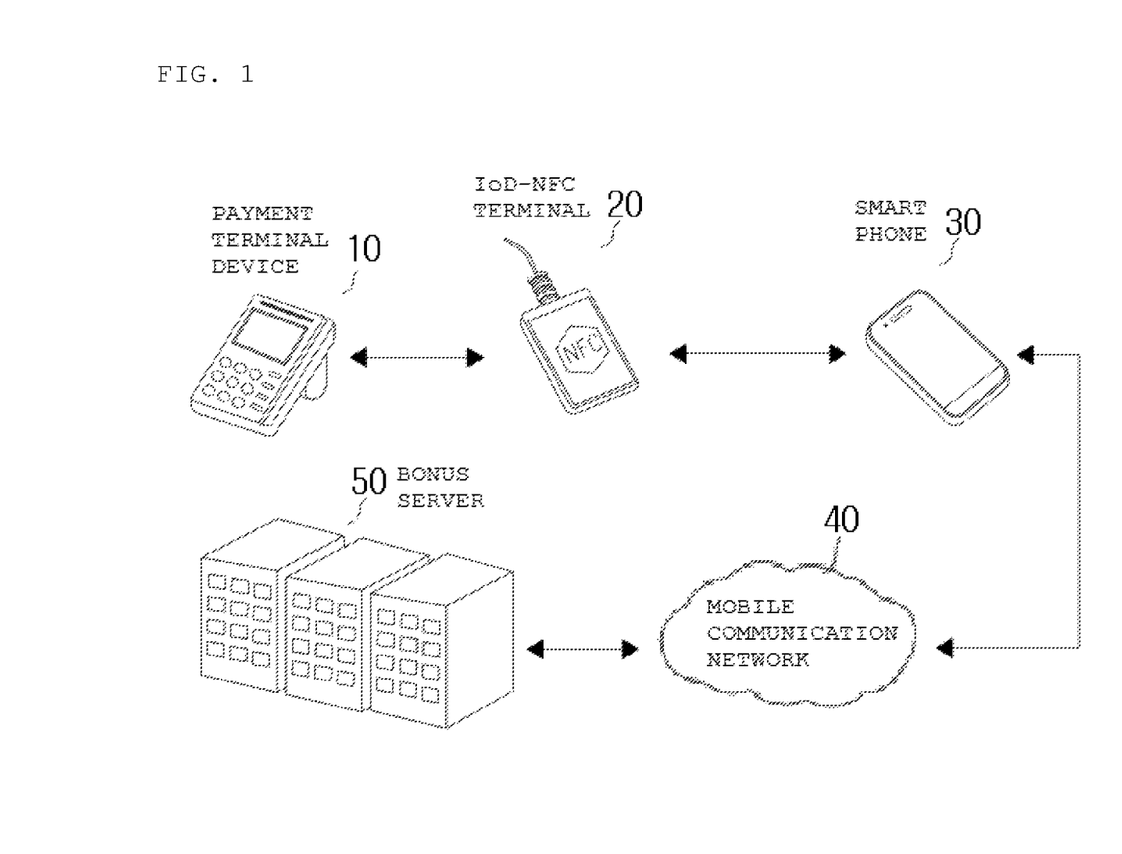
FIG. 1 is a diagram illustrating the configuration of a bonus accumulation system according to an embodiment of the present invention.

FIG. 1 is a diagram illustrating the configuration of a bonus accumulation system according to an embodiment of the present invention. The bonus accumulation system 100 according to the embodiment of the present invention includes a payment terminal device 10 of a business branch, an IoD-NFC terminal device 20 having an Internet of data (IoD) based near field communication (NFC) function, a user terminal device 30, a mobile communication network 40, and a bonus server 50.

Referring to FIG. 1, the payment terminal device 10 may be one of a CAT terminal device, a point of sale (POS) terminal device, and a wireless Internet or general NFC based wireless payment terminal device installed in each business branch and acquires final payment approval data of a commercial transaction through the same network (e.g., VAN) as the payment terminal device in the related art and transmits the acquired final payment approval data to the IoD-NFC terminal device 20 through serial communication. The payment terminal device 10 may include a serial communication port for outputting the final payment approval data in order to output a receipt, etc., and the data may be transmitted to the IoD-NFC terminal device 20 through the serial communication port.

The IoD-NFC terminal device 20 receives the final payment approval data of the commercial transaction from the payment terminal device 10 through a serial communication module installed in the payment terminal device 10, calculates bonus data based on a predetermined condition corresponding to the received final payment approval data, and transmits the calculated bonus data to the user terminal device 30. The predetermined condition may depend on the user terminal device and the IoD-NFC terminal device 20 may identify the user terminal device based on an identification number of the user terminal device.

The IoD-NFC terminal device 20 identifies whether the user subscribes to a bonus server and whether the user subscribes to an application (hereinafter, referred to as a bonus application) for communication with the bonus server based on the identification number of the user terminal device. When the user terminal device 30 does not subscribe to the bonus server 50 or does not log on a current application, the IoD-NFC terminal device 20 may calculate the bonus data based on only the identification number of the user terminal device. When the user terminal device 30 subscribes to the bonus server 50 or logs on a current application, the IoD-NFC terminal device 20 may calculate the bonus data based on the identification number of the user terminal device and user information stored in the bonus server and automatically aggregate the calculated bonus data and data saved in the bonus server.

The bonus data may include points, mileages, electronic coupons, electronic stamps, electronic lottery tickets, electronic gift tickets, and event winning tickets, but are not limited thereto and may include all services which may be provided after a payment approval and may be transmitted while including the identification number of the user terminal device, a security authentication key of the bonus data, and a one-to-one virtual data generation security token between the payment terminal device and the user terminal device.

The IoD-NFC terminal device 20 may be configured integratedly with the payment terminal device 10, configured integratedly with a sign-pad connected with the payment terminal device 10, configured integratedly with a peripheral device other than the payment terminal device 10 and the sign-pad, or configured with a separate device from the payment terminal device 10, the sign-pad, and the peripheral device.

The user terminal device 30 receives and stores the bonus data from the IoD-NFC terminal device 20 by using the NFC and requests the approval of the bonus data received by the bonus server 50 by using the mobile communication network 40. The approval request of the bonus data includes the user information such as a unique number (the identification number of the user terminal device) of the user terminal device and a subscription ID of a bonus company.

The user terminal device 30 may be, for example, any one of a smart phone, a smart pad, and a personal digital assistant (PDA) having an NFC, Beacon, or Bluetooth function device, but is not limited thereto and may include all computing devices that may transmit data such as the bonus data through a wired/wireless communication network.

The approval request may be transmitted through the bonus application according to user selection or transmitted in a manner to append the bonus data in a message through SMS, MMS, and a messenger for the smart phone. The messenger for the smart phone may include Kakaotalk, Line, Whats app, Kik, Snapchat, and the like, but is not limited thereto and may include a predetermined type messenger to transmit the data by using the mobile communication network.

The mobile communication network 40 is a communication network that enables communication between the user terminal device 30 and the bonus server 50 and in the present invention, a predetermined appropriate communication network is considered. As an example, without a limit, the mobile communication network 40 may include Ad-hoc network, Intranet, Extranet, virtual private network (VPN), local area network (LAN), wireless LAN (WLAN), wide area network (WAN), wireless WAN (WWAN), metropolitan area network (MAN), Internet, public switched telephone network (PSTN), cellular phone network, or a combination of two or more thereof.

The bonus server 50 receives the approval request of the bonus data received from the user terminal device 30 through the mobile communication network 40. The received approval request includes user information such as a provider (business branch) of the bonus data, the unique number of the user terminal device, and the bonus subscription ID in addition to the bonus data. The bonus server 50 authenticates the bonus data, and the provider and the user of the bonus data and transmits an authentication result to the user terminal device 30 through the mobile communication network 40. The bonus server 50 may also aggregate, deduct, calculate, and store the bonus data and integrate the same type of bonus data which a specific user accumulates in multiple bonus accumulation business branches by performing processing associated with Web and application services.

The bonus server 50 may be the server or system of a payment approval company, which directly performs the payment approval or a server or system having an approval mediation communication network function and may include the IoD network or include and combinationally use the IoD-NFC terminal device or function.

Further, the bonus server 50 may approve the bonus data without a separate prior subscription procedure with respect to the user terminal device which initially uses the service of the corresponding bonus company. The approval may be made based on the unique number (e.g., a phone number of the smart phone) of a non-subscription user terminal device 30 that requests approval of the bonus data and the bonus server 50 may store the data of the non-subscription user terminal device 30 in a separate database DB.

When a non-subscription user subscribes to the corresponding bonus company later (alternatively, when the bonus application of the corresponding bonus company is installed), the bonus server 50 may integrate the bonus data through a procedure of verifying the unique numbers of the user and the user terminal devices and thereafter, searching the bonus data of a subscription user from the DB and aggregating and matching the bonus data.

It is described as an example that the bonus accumulation system according to the embodiment of the present invention calculates the bonus data in the IoD-NFC terminal device 30 and transmits the calculated bonus data to the user terminal device 30, but the present invention is not limited thereto. According to another embodiment of the present invention, the IoD-NFC terminal device 20 may not calculate the bonus data and the IoD-NFC terminal device 20 may transmit the final payment approval data received by the payment terminal device 10 of the business branch to the user terminal device 30 as it is and the user terminal device 30 may receive the final payment approval data and thereafter, calculate the bonus data according to a predetermined bonus type application criterion and a bonus calculation criterion through, for example, the bonus application stored in the user terminal device 30.

According to yet another embodiment of the present invention, the IoD-NFC terminal device 20 may not calculate the bonus data and the IoD-NFC terminal device 20 may transmit the final payment approval data received by the payment terminal device 10 of the business branch to the user terminal device 30 as it is and the user terminal device 30 immediately transmits the final payment approval data to the bonus server 50 and the bonus server 50 may calculate the bonus data according to a prestored bonus data calculation criterion for each business branch.

For example, when as the bonus data calculation criterion prestored in the database DB of the bonus server 50, the type of bonus data of business branch A is a point, the point calculation criterion is set to 5% of a payment amount and the payment amount of the final payment approval data of business branch A, which is received from the user terminal device 30 is received as 50 thousand won, the bonus server 50 may calculate 2500 points which is 5% of 50 thousand won as the bonus point and reply to the user terminal device.

As another example, when as the bonus data calculation criterion prestored in the database of the bonus server 50, the type of bonus data of business branch B is an electronic stamp and as an electronic stamp calculation criterion, one electronic stamp is set when the payment amount is less than 20 thousand won and two electronic stamps are set when the payment amount is equal to or more than 20 thousand won, and when the payment amount of the final payment approval data of business branch B, which is received from the user terminal device 30 is received as 30 thousand won, the bonus server 50 may calculate two electronic stamps and reply to the user terminal device.

The accumulated bonus may be used by using the bonus application installed in the user terminal device 30. The user may perform an authentication by inputting an ID, a password, etc. in the bonus application installed in the user terminal device 30 and pay a part or the entirety of payment cost with the bonus by short-distance contacting (approaching an NFC operation range) the IoD-NFC terminal device 20 after the authentication. In this case, the IoD-NFC terminal device 20 may transmit bonus use data to the payment terminal device 10 and the payment terminal device 10 may use the accumulated bonus by a scheme approved by the bonus server 50 via the VAN communication network in the same manner as a payment approval procedure of a general payment terminal device.

Figure 2:
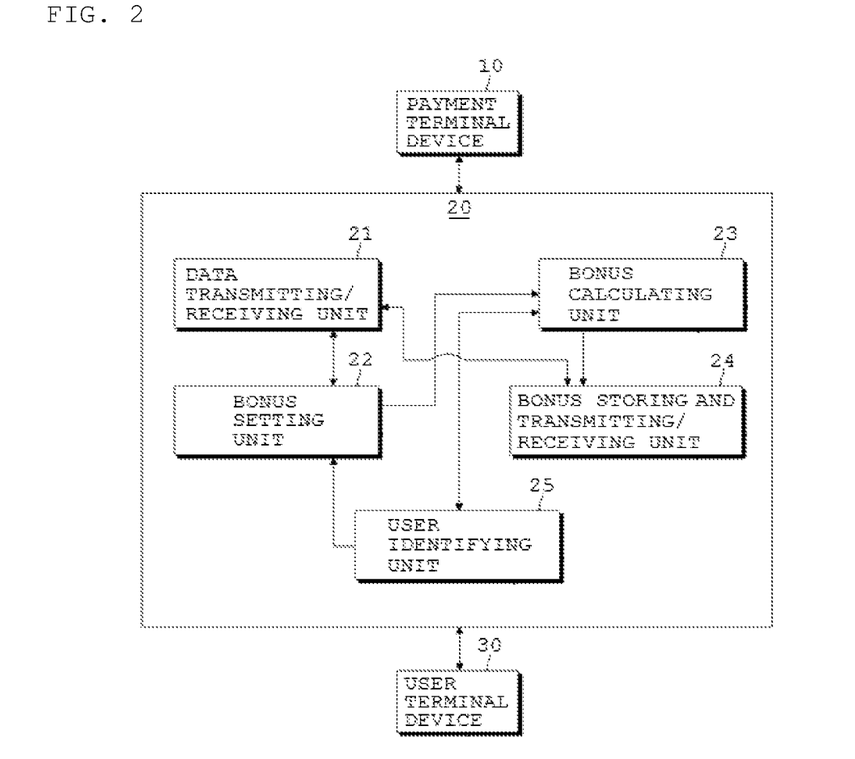
FIG. 2 is a block diagram illustrating a detailed configuration of an IoD-NFC terminal device illustrated in FIG. 1.

FIG. 2 is a block diagram illustrating a detailed configuration of an IoD-NFC terminal device illustrated in FIG. 1. Referring to FIG. 2, the IoD-NFC terminal device 20 according to the embodiment of the present invention includes a data transmitting/receiving unit 21, a bonus setting unit 22, a bonus calculating unit 23, a bonus storing and transmitting/receiving unit 24, and a user identifying unit 25.

The data transmitting/receiving unit 21 may communicate with the payment terminal device 10 through a serial communication unit and receive the final payment approval data (e.g., the payment amount, a payment means, a payment business branch, a payment date and time, other unique division information, etc.) including completion of a final payment approval of a credit card or verification of cash receipt from the payment terminal device 10. The data transmitting/receiving unit 21 transmits the received final payment approval data to the bonus setting unit 22 and the bonus calculating unit 23.

The bonus setting unit 22 sets various bonus types and application criteria in advance. The bonus setting unit 22 provides the bonus type (e.g., the points, the mileages, the electronic coupons, the electronic stamps or quizzes, lottery, an event, or one or more bonuses among other types of appreciation coupons) and application criteria set for the bonus calculating unit 23 to calculate the bonus data based on the final payment approval data received from the data transmitting/receiving unit 21.

For example, the bonus setting unit 22 may provide the bonus type and application criteria so as to limit the type of the bonus only to one type, the point when the payment amount is less than 50 thousand won, apply two types, the point and the electronic coupon when the payment amount is equal to or more than 50 thousand won, and calculate the corresponding bonus data by the bonus calculating unit 23.

In this case, as a criterion to simultaneously apply one or more types of bonuses, the payment means such as the credit card, the cash, or electronic money in addition to the final payment amount may be adopted. For example, as the bonus type, only one type, the point, may be applied to a cash payment and two types, the point and the electronic coupon, may be applied to a credit card payment. Further, as a criterion to simultaneously apply one or more types of bonuses, user status or degree classification such as wireless Internet application (app) installation or subscription may be adopted. For example, only one type, the point may be applied to a user which is classified as a normal user and two types, the point and the electronic coupon, may be applied to a user which is classified as an excellent user.

Moreover, the bonus type may be set depending on a business branch whereabouts region (bonus handling region). For example, as the bonus type, only one type, the point, may be applied to Seoul and two types, the point and the electronic coupon, may be applied to other regions. Further, the bonus type may be set depending on a bonus handling scale of the business branch. For example, as the bonus type, only one type, the point may be applied to a case where the number of bonuses handled during a last month is less than 10, two types, the point and the electronic coupon may be applied to a case where the number of bonuses handled during the last month is equal to or more than 10, and the bonus type may be set depending on a bonus handling time or order. For example, as the bonus type, only one of point may be set to be applied to morning or the handling order less than a tenth handling order of that day and two types of the point and the electronic coupon may be set to be applied to afternoon and the handling order equal to or more than the tenth handling order of that day. Besides, one or more types of bonuses may be applied according to various criteria. The bonus setting unit 22 may selectively apply or not apply the bonus type as necessary to customized integrated bonus providing for flexible marketing of the bonus company or a franchised business branch.

The bonus calculating unit 23 calculates the bonus data for the final payment approval data (e.g., the payment date and time, the payment amount, a payment method, etc.) received by the data transmitting/receiving unit 21 according to the bonus data calculation criterion predetermined by the bonus setting unit 22. As described above, the bonus data calculation criterion includes the bonus type, a bonus accumulation rate, etc., but is not limited thereto and may include a weighted value depending on various information including user identification information, business branch information, etc. In this case, in order to authenticate whether the calculated and transmitted/received bonus data is authentic, the bonus calculating unit 23 may apply security token generation and forgery and replication prevention algorithms to the bonus data in addition to the bonus data.

The bonus calculating unit 23 may automatically aggregate the bonus data of the user by using a user non-verification bonus automatic aggregation algorithm. The bonus calculating unit 23 calculates the bonus data based on only the identification number of the user terminal device identified by the IoD-NFC terminal device 20 and transmits the calculated bonus data to the user terminal device 20 in the case where the user does not subscribe to the bonus server 50, that is, when the user does not use the bonus application or does not log on the bonus application as described above. Thereafter, when the user subscribes to and logs on the bonus application through the user terminal device 30, the bonus calculating unit 23 applies the user non-verification bonus automatic aggregation algorithm to the bonus data, and as a result, a log-on state is automatically scanned in the user terminal device later to match and automatically aggregate the bonus data in an NFC data storage in the user terminal device 20 with the user bonus data.

Besides, the bonus calculating unit 23 may be set to calculate each bonus data according to the final payment approval data or set to similarly calculate predetermined bonus data only with a final payment approval fact. Further, in addition to the scheme, the bonus calculating unit 23 may be set to transmit the final payment approval data to the bonus storing and transmitting/receiving unit 24 without using the bonus calculating unit 23. That is, the final payment approval data may be directly transmitted from the data transmitting/receiving unit 21 to the bonus storing and transmitting/receiving unit 24 without passing through the bonus setting unit 22 or the bonus calculating unit 23 and the bonus storing and transmitting/receiving unit 24 may calculate the bonus data according to a criterion which is the same as the criterion predetermined in the bonus setting unit 22.

The bonus storing and transmitting/receiving unit 24 may store the bonus data calculated by the bonus calculating unit 23 and the data transmitting/receiving unit 21 may transmit the bonus data stored in the bonus storing and transmitting/ receiving unit 24 to the user terminal device 30 with the NFC function (alternatively, including the Beacon and Bluetooth functions) by using the NFC through a wireless communication unit.

The bonus storing and transmitting/receiving unit 24 may set a timer function limiting a data transmission deadline and a signal sound or a guidance sound to be generated when transmitting or transmitting/receiving the bonus data is completed in order to block illegal reception of the bonus data by a third person, etc. after a predetermined transmission limit deadline. Besides, the bonus storing and transmitting/receiving unit 24 may transmit the bonus data, query a non-transmission/reception history, and retransmit a non-transmitted bonus.

In this case, the bonus storing and transmitting/receiving unit 24 may transmit/receive the bonus data through the NFC with the user terminal device 30 with the NFC while the NFC device is embedded and transmit an Internet wireless security communication application using an NFC-peer to peer (P2P) technology by setting a function to transmit the Internet wireless security communication application to the user terminal device 30, etc. together with the bonus data.

The user identifying unit 25 may identify user's unique information, for example, the unique number (e.g., the phone number of the user terminal device) of the user terminal device by using the NFC-peer to peer (P2P) technology when the IoD-NFC terminal device 20 transmits/receives the bonus data to/from the user terminal device 30 and identify whether the bonus application in the user terminal device is installed and the log-on state of the bonus application.

Further, the user identifying unit 25 may receive a classification code for each subscriber in the log-on state, etc. by using the NFC-P2P technology and transmit the user identification information to the bonus setting unit 22 or the bonus calculating unit 23 simultaneously with receiving the user identification information to be included in the bonus data depending on the user identification information.

During the bonus exchange, use (payment), and association functions, the bonus calculating unit 23 and the bonus setting unit 22 are not required and the bonus exchange, use (payment), and association functions serve as an associator function so as to request a bonus exchange use approval in the order of the user terminal device identifying unit 25, the bonus storing/transmitting/receiving unit 24, the data transmitting/receiving unit 21, and the payment terminal device 10 in a reverse direction to the calculation of the bonus.

Figure 3:
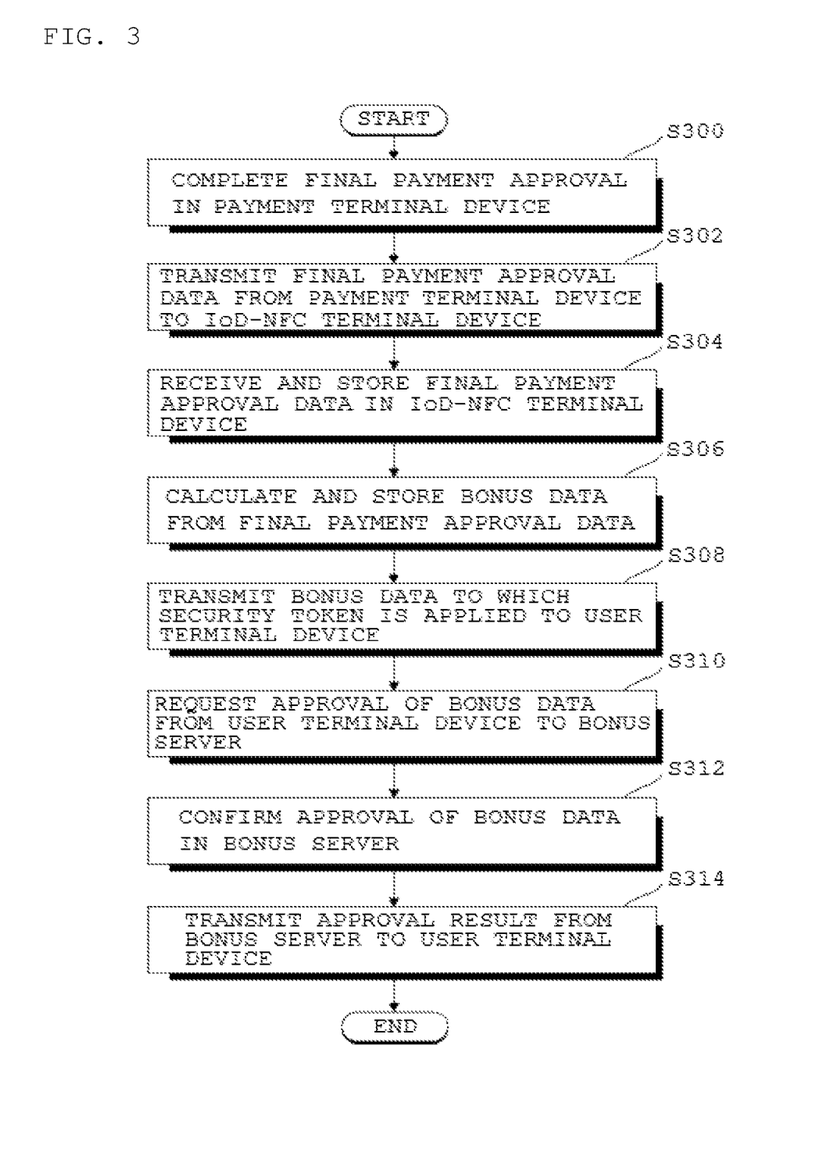
FIG. 3 is a flowchart illustrating a bonus accumulation method of the bonus accumulation system illustrated in FIG. 1.

FIG. 3 is a flowchart illustrating a bonus accumulation method of the bonus accumulation system illustrated in FIG. 1. In the bonus accumulation method according to the embodiment of the present invention, it is premised that the bonus data is calculated and approved by using only the final payment approval data of the payment terminal device of the business branch without passing through the VAN or POS system or using the association network of the direct payment approval company.

First, the bonus accumulation method according to the embodiment of the present invention starts at a step (S300) of performing, by the user, the payment by using the payment terminal device 10 of the business branch and the payment terminal device 10 completes the final payment approval.

The payment terminal device 10 acquires the final payment approval data and transmits the acquired final payment approval data to the IoD-NFC terminal device 20 by using the serial communication (S302). The data may be transmitted by transferring the final payment approval data to an internal serial modem of the payment terminal device 10 and transmitting the transferred final payment approval data to the IoD-NFC terminal device 20 which serial-communications with the payment terminal device 10. Herein, the IoD-NFC terminal device 20 may be configured integratedly with the payment terminal device 10, configured integratedly with a sign-pad connected with the payment terminal device 10, configured integratedly with a peripheral device other than the payment terminal device 10 and the sign-pad, or configured with a separate device from the payment terminal device 10, the sign-pad, and the peripheral device.

The IoD-NFC terminal device 20 receives the final payment approval data from the payment terminal device 10 and stores the received final payment approval data (S304). Next, the IoD-NFC terminal device 20 calculates the bonus data from the final payment approval data and stores the calculated bonus data (S306). As described above, the IoD-NFC terminal device 20 includes the bonus setting unit 22, the bonus calculating unit 23 and the bonus setting unit 22 has various bonus types and application criteria set in advance. The bonus setting unit 22 provides the bonus type (e.g., the points, the mileages, the electronic coupons, the electronic stamps or quizzes, lottery, an event, or one or more bonuses among other types of appreciation coupons) and application criteria set for the bonus calculating unit 23 to calculate the bonus data based on the final payment approval data received from the data transmitting/receiving unit 21. The bonus calculating unit 23 calculates the bonus data for the final payment approval data according to the bonus data calculation criterion predetermined by the bonus setting unit 22.

In this case, the user identifying unit 25 of the IoD-NFC terminal device 20 may identify the user's unique information, for example, the unique number (e.g., the phone number of the smart phone) of the user terminal device during the NFC communication with the user terminal device. The user identifying unit 25 may identify whether the bonus application of the user terminal device is installed and the log-on state of the bonus application and further, identify user classification information such as the excellent or normal user based on the user identification information. Besides, the user identifying unit 25 may automatically receive the identification information using the NFC-P2P technology, such as the classification code for each subscriber in the log-on state, etc. and automatically transmit the identification information to the bonus setting unit 22 or the bonus calculating unit 23 simultaneously with automatically receiving the identification information to be applied as a specific criterion at the time of calculating the bonus data depending on the identification information.

Next, the IoD-NFC terminal device 20 transmits the calculated bonus data to the user terminal device 30 (S308). In this case, in order to authenticate whether the calculated and transmitted/received bonus data is authentic, in a final approval step between bonus data and the bonus server, disposal virtual data security token generation and forgery and replication prevention algorithms for each one case of data for a target of comparing the user information and information on a bonus providing business branch are automatically generated to apply an automatic encryption operation to the bonus data.

The IoD-NFC terminal device 20 may transmit the calculated bonus data to the user terminal device 30 and thereafter, announce that the bonus data is transmitted through a buzzer signal sound or a guidance sound and display the bonus data in a display device such as a liquid crystal display, etc.

The user verifies the bonus data received by the user terminal device 30 and thereafter, requests the approval of the bonus data to the bonus server 50 according to the guidance sound or a guidance displayed in the display (S310). The approval of the bonus data may be transmitted through the bonus application and when the bonus application is not installed or the user terminal device 30 does not log in the bonus application, the approval of the bonus data may be transmitted by appending the bonus data to the SMS, the MMS, or the smart phone messenger and transmitting the appended bonus data. The messenger for the smart phone may include Kakaotalk, Line, Whats app, Kik, Snapchat, and the like, but is not limited thereto and may include a predetermined type of messenger to transmit the data by using the mobile communication network.

The bonus server 50 receives a request for the approval of the bonus data from the user terminal device 30 and approves the request (S312). The received approval request includes user information such as a provider (business branch) of the bonus data, the unique number of the user terminal device, and the bonus subscription ID in addition to the encrypted bonus data. The bonus server 50 decodes the bonus data and approves the provider and the user of the bonus data. The bonus server 50 may also aggregate, deduct, calculate, and store the bonus data depending on the user and integrate the same type of bonus data which a specific user accumulates in multiple bonus accumulation business branches by performing processing associated with Web and application services. The bonus server 50 performs an authentication procedure for the user terminal device (that is, the user) based on the unique information of the user terminal device 30, which is received from the user terminal device 30 and integratedly manages the bonus data for the corresponding user based on the authentication procedure. That is, the bonus server 50 stores bonus data associated with the bonus, such as an accumulation bonus depending on the authenticated user, a usable bonus, an extinguished bonus, etc.

Further, the bonus server 50 may approve the bonus data without a separate prior subscription procedure with respect to the user terminal device which initially uses the service of the corresponding bonus company. The approval may be made based on the unique number (e.g., a phone number of the smart phone) of a non-subscription user terminal device 30 that requests approval of the bonus data and the bonus server 50 may store the data of the non-subscription user terminal device 30 in a separate database DB.

When a non-subscription user subscribes to the corresponding bonus company later (alternatively, when the bonus application of the corresponding bonus company is installed), the bonus server 50 may integrate the bonus data through a procedure of verifying the unique numbers of the user and the user terminal devices and thereafter, searching the bonus data of a subscription user from the DB and aggregating and matching the bonus data. By such a procedure, the bonus server 30 may use the bonus data which the user accumulates before subscribing in a membership.

Next, the bonus server 50 transmits the approval result to the user terminal device 30 through the mobile communication network 40 (S314).

The bonus may be exchanged and used (paid) only while logging in the bonus application exclusively for the bonus server 50 storing the bonus. The user performs a user authentication by registering the password, etc. while logging in the bonus application installed in the user terminal device 30. Thereafter, the bonus is exchanged and used in a reverse direction to accumulation of the bonus by short-distance contacting the user terminal device 30 with the IoD-NFC terminal device 20.

That is, when the user selects the exchange and use of the bonus through the bonus application installed in the user terminal device 30 in order to exchange and use the bonus and short-distance contacts the user terminal device 30 with the IoD-NFC terminal device 20, available bonus data of the user is transmitted to the payment terminal device 10 through the user identifying unit 30, the bonus storing and transmitting/receiving unit 24, and the data transmitting/receiving unit 21 of the IoD-NFC terminal device 20 in sequence and the business branch verifies the available bonus data of the user and requests the use (payment) approval in the payment terminal device 10. The use approval request in the business branch may be transmitted to the bonus server 50 via the VAN communication network in the same manner as the payment approval procedure of the normal payment terminal device and the bonus server 50 approves the use approval request to exchange and use the bonus.

Figure 4:
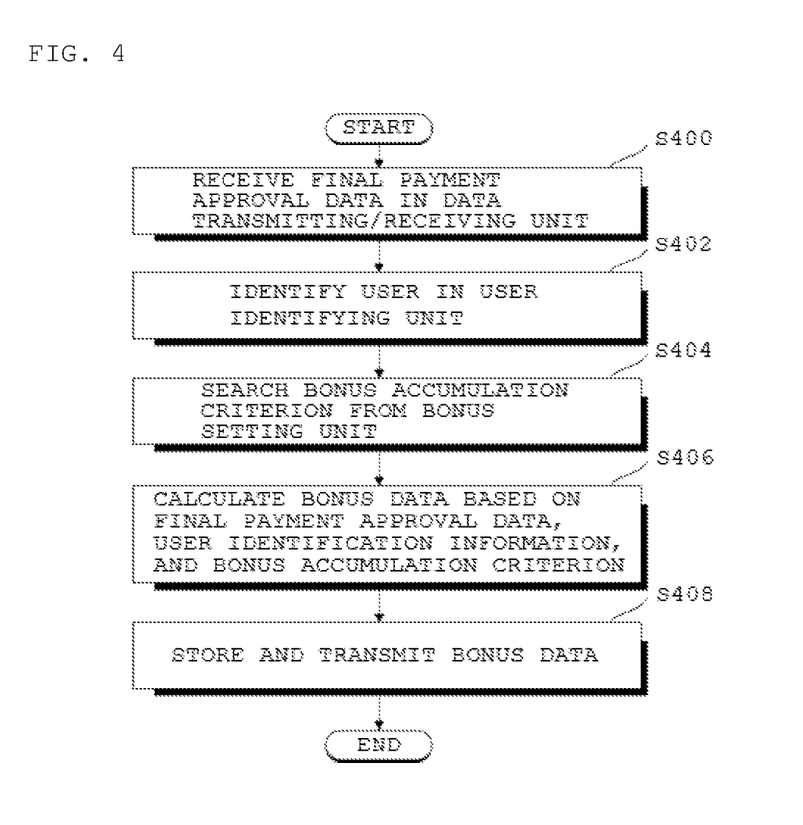
FIG. 4 is a flowchart illustrating a detailed operation of the IoD-NFC terminal device of FIG. 2.

FIG. 4 is a flowchart illustrating a detailed operation of the IoD-NFC terminal device of FIG. 2. Referring to FIG. 4, the operation of the IoD-NFC terminal device 20 according to the embodiment of the present invention starts from receiving the final payment approval data by the data transmitting/receiving unit 21 (S400). The data transmitting/receiving unit 21 may receive the final payment approval data (e.g., the payment amount, the payment means, the payment business branch, the unique classification information, etc.) such as completion of the final payment approval of the credit card or verification of the cash receipt from the payment terminal device 10 through the serial communication, for example, the public switched telephone network (PSTN) and transmit the received final payment approval data to the bonus setting unit 22 and the bonus calculating unit 23.

Next, the user identifying unit 25 identifies the user (S402). The user identifying unit 25 may identify user's unique information, for example, the unique number (e.g., the phone number of the user terminal device) of the user terminal device when the IoD-NFC terminal device 20 transmits/receives the data to/from the user terminal device 30 and identify whether the bonus application in the user terminal device is installed and the log-on state of the bonus application or the classification information for each subscriber. The user identifying unit 25 transmits the user identification information to the bonus setting unit 22 or the bonus calculating unit 23 simultaneously with the user identification to calculate the bonus data according to the user identification information.

The bonus calculating unit 23 searches the bonus accumulation criterion from the bonus setting unit 22 simultaneously with the user identification (S402) or sequentially (S404). The bonus setting unit 22 has various bonus type and application (accumulation) criteria set in advance and sets the bonus type application criterion so that the bonus calculating unit 23 may calculate the bonus data based on the final payment approval data received from the data transmitting/receiving unit 21, a predetermined bonus type application criterion, and the identification information received from the user identifying unit through the NFC with the user terminal device.

One or more bonuses may be simultaneously applied, among various types of bonuses, for example, the points, the mileage, the electronic coupons, the electronic stamps, the quiz, the lottery, the event, and other types of appreciation coupons according to the bonus type application criterion.

As one example, the bonus setting unit 22 may set only one type, the point as the bonus type to be applied to the case where the payment amount is less than 50 thousand won and apply two types of the point and the electronic coupon to the case where the payment amount is equal to or more than 50 thousand won. Besides, the bonus setting unit 22 may set the types of bonus and the bonus accumulation criteria applied according to various criteria and selectively apply a method required for providing the customized integrated bonus for flexible marketing of the bonus company or the franchised business branch.

The bonus calculating unit 23 calculates the bonus data from the final payment approval data based on the user identification information searched by the user identifying unit 25 and the predetermined type of the bonus and the bonus accumulation criterion searched by the bonus setting unit 22 (step 406). Further, the bonus calculating unit 23 may apply the bonus data forgery and replication prevention security algorithm or the security token algorithm to be applied to the bonus data to the calculated bonus data. In this case, the bonus calculating unit 23 may set the bonus data to be calculated differently according to the final payment approval data, set a predetermined bonus to be calculated in the same manner only by a final payment approval fact, or selectively apply any one of schemes of transmitting the final payment approval data to the bonus storing and transmitting/receiving unit 24 without passing through the bonus calculating unit 23 unlike the two schemes.

Next, the bonus storing and transmitting/receiving unit 24 stores the bonus data calculated by the bonus calculating unit 23 and thereafter, transmits the bonus data to the user terminal device 30 by using the data transmitting/receiving unit 21 (S408). Further, after a predetermined limit time, in order to prevent illegal reception of the bonus data by a third person, etc., a time function to limit a data reception time and a buzzer signal sound or a guidance sound or a monitor screen guidance is set to be generated at the time of completing transmission and transmission/reception of the bonus data and transmitted or untransmitted bonus data stored in a predetermined capacity limit may be searched and the untransmitted bonus data may be retransmitted.

Meanwhile, detailed embodiments have been described in describing the present invention and various modifications may be executed without departing from the scope of the present invention. Therefore, the scope of the present invention is not defined by the aforementioned embodiment and should be determined by the appended claims.

INDUSTRIAL APPLICABILITY

The present invention may be applied to various terminal devices, etc.

The invention claimed is:
1. A bonus accumulation system comprising:
a payment terminal device is installed in a business branch and configured to:
 transmit a commercial transaction approval request to a payment approval company,
 receive final payment approval data corresponding to a commercial transaction approval confirmation from the payment approval company,
 directly transmit the final payment approval data to an Internet of Data-Near Field Communication (IoD-NFC) terminal device using a serial communication module, the final payment approval data indicating completion of a final payment approval of a credit card or verification of cash receipt at the payment terminal device,
 receive available bonus data from the IoD-NFC terminal device during a bonus exchange operation,
 transmit a request for a bonus exchange approval to a bonus server over an added value communication network based on the received available bonus data in a same manner as a method for transmitting a transaction approval request of a commercial transaction to a payment approval company, and
 receive a bonus exchange approval from the bonus server over the added value communication network in a same manner as a method for receiving an approval confirmation of a commercial transaction from a payment approval company;
the IoD-NFC terminal device, physically separated from the payment terminal device except for a physical serial connection with the serial communication module and configured to communicate through near field communication (NFC), the IoD-NFC terminal device configured to:
 directly receive the final payment approval data from the serial communication module of the payment terminal device,
 identify user information of a user terminal device through NFC with the user terminal device, the user information including an identification number of the user terminal device,
 determine whether a bonus application dedicated to the bonus server is installed in the user terminal device,
 determine whether the bonus application is in a log-in state when it is determined that the bonus application is installed,
 determine whether a user of the user terminal device subscribes to the bonus server based on the identification number,
 internally calculate bonus data directly from received final payment approval data based on at least one predetermined condition and only on the identification number of the user terminal device when it is determined that the user does not subscribe to the bonus server and that the bonus application is not in a log-in state,
 internally calculate bonus data directly from received final payment approval data based on at least one predetermined condition and on the identification number of the user terminal device and user information stored in the bonus server by automatically aggregating newly calculated bonus data with the user information data stored in the bonus server when it is determined that the user subscribes to the bonus server and when it is determined that the bonus application is in a log-in state,
 wirelessly transmit the directly calculated bonus data to the user terminal device through NFC
 wirelessly receive available bonus data from the user terminal device through NFC during a bonus exchange operation, and
 transmit the available bonus data to the payment terminal device during a bonus exchange operation;
the user terminal device, physically separated from the IoD-NF terminal device and the payment terminal device, and the user terminal device configured to:
 wirelessly receive the directly calculated bonus data from the IoD-NFC terminal device through NFC, send a request for an approval of the bonus data to the bonus server over a mobile communication network, receive the approval of the bonus data from the bonus server over the mobile communication network, and initiate a bonus exchange by transmitting the available bonus data through NFC contacting to the IoD-NFC terminal device while the bonus application is in a log-in state; and the bonus server configured to:

receive the request for the approval of the bonus data from the user terminal device, approve the bonus data, aggregate the bonus data, deduct the bonus data, store the bonus data, transmit the approval of the bonus data to the user terminal device over the mobile communication network, receive the request for the bonus exchange approval from the payment terminal device over the added value communication network, determine whether to approve the bonus exchange, and transmit the bonus exchange approval to the payment terminal device over the added value communication network.

2. The bonus accumulation system of claim 1, wherein the request for an approval of the bonus data includes the directly calculated bonus data, the identification number of the user terminal device, business branch information, a security authentication key, and a security token of the bonus data; and wherein the directly calculated bonus data includes at least one selected from a group comprising points, mileages, electronic coupons, electronic stamps, electronic lotteries, electronic appreciation coupons, and event winning tickets.

3. The bonus accumulation system of claim 1, wherein the IoD-NFC terminal device includes at least on of:

a sign-pad integrated component configured integratedly with a sign-pad, a peripheral device integrated component configured integratedly with a peripheral device other than the sign-pad, and a separate terminal device component configured as a separate device.

4. The bonus accumulation system of claim 1, wherein the IoD-NFC terminal device further includes an alarm module configured to announce that the directly calculated bonus data is transmitted or announce a calculation amount of the directly calculated bonus data through an acoustic device or a monitor after transmitting the directly calculated bonus data.

5. The bonus accumulation system of claim 1, wherein the user terminal device is configured to transmit the request for approval of the bonus data to the bonus server through the bonus application dedicated to the bonus server, SMS, MMS, or a messenger application.

6. A method for accumulating a bonus in an Internet of Data-Near Field Communication (IoD-NFC) terminal device installed in a business branch and physically separated from a payment terminal device except for a physical serial connection with a serial communication module of the payment terminal device and that is configured to communicate with a physically separated user terminal device through near field communication (NFC) based on Internet of Data (IoD), the method comprising:

transmitting, by the payment terminal device, a commercial transaction approval request to a payment approval company;

receiving, by the payment terminal device, final payment approval data corresponding to a commercial transaction approval confirmation from the payment approval company, directly transmitting, by the payment terminal device, the final payment approval data to the IoD-NFC terminal device using the serial communication module, the final payment approval data indicating completion of a final payment approval of a credit card or verification of cash receipt at the payment terminal device, directly receiving, by the IoD-NFC terminal device, the final payment approval data from the serial communication module of the payment terminal device;

identifying, by the IoD-NFC terminal device, user information of the user terminal device through NFC with the user terminal device, the user information including an identification number of the user terminal device;

determining, by the IoD-NFC terminal device, that a bonus application dedicated to a bonus server is not installed in the user terminal device and/or that the bonus application is not in a log-in state;

determining, by the IoD-NFC terminal device, that a user of the user terminal device does not subscribe to the bonus server based on the identification number;

calculating, internally in the IoD-NFC terminal device, bonus data directly from the received final payment approval data based on a predetermined bonus type and an application criteria, and further based only on the identification number of the user terminal device responsive to the determination that the user does not subscribe to the bonus server and the determination that the bonus application is not in a log-in state;

wirelessly transmitting, by the IoD-NFC terminal device, the directly calculated bonus data to the user terminal device through NFC;

sending, by the user terminal device, a request for an approval of the bonus data to a bonus server over a mobile communication network, wherein the request for the approval is sent by using the application dedicated to the bonus server, or appending the bonus data via SMS, MMS, or a smart phone messenger;

receiving, by the bonus server, the request for the approval of the bonus data from the user terminal device;

approving, by the bonus server, the bonus data;

aggregating, by the bonus server, the bonus data;

deducting, by the bonus server, the bonus data;

storing, by the bonus server, the bonus data;

transmitting, by the bonus server, the approval of the bonus data to the user terminal device over the mobile communication network, receiving, by the user terminal device, the approval of the bonus data from the bonus sever over the mobile communication network;

initiating a bonus exchange by wirelessly transmitting, by the user terminal device, available bonus data through NFC contacting to the IoD-NFC terminal device while the bonus application is in a log-in state;

wirelessly receiving, by the IoD-NFC terminal device, the available bonus data from the user terminal device through NFC during the bonus exchange operation;

transmitting, by the IoD-NFC terminal device, the available bonus data to the payment terminal device during the bonus exchange operation;

receiving, by the payment terminal device, the available bonus data from the IoD-NFC terminal device during the bonus exchange operation;

transmitting, by the payment terminal device, a request for a bonus exchange approval to the bonus server over an added value communication network based on the received available bonus data in a same manner as a method for transmitting a transaction approval request of a commercial transaction to a payment approval company;

determining, by the bonus server, to approve the bonus exchange;

transmitting, by the bonus server, a bonus exchange approval to the payment terminal device over the added value communication network;

receiving, by the payment terminal device, the bonus exchange approval from the bonus server over the added value communication network in a same manner as a method for receiving an approval confirmation of a commercial transaction from a payment approval company;

receiving, by the IoD-NFC terminal device, second final payment approval data from the serial communication module of the payment terminal device;

identifying, by the IoD-NFC terminal device, second user information of a second user terminal device through NFC with the second user terminal device, the second user information including a second identification number of the second user terminal device;

determining, by the IoD-NFC terminal device, that the bonus application dedicated to a bonus server is installed in the second user terminal device;

determining, by the IoD-NFC terminal device, that the bonus application is in a log-in state;

determining, by the IoD-NFC terminal device, that a user of the second user terminal device subscribes to the bonus server based on the second identification number; and calculating, internally in the IoD-NFC terminal device, bonus data directly from the received second final payment approval data based on a predetermined bonus type and an application criteria, and further based on the second identification number of the second user terminal device and user information stored in the bonus server by automatically aggregating newly calculated bonus data with the user information data stored in the bonus server based on the determination that the user of the second user terminal subscribes to the bonus server and the determination that the bonus application installed on the second user terminal device is in a log-in state.

7. The bonus accumulation method of claim 6, wherein the final payment approval data comprises a payment amount, a payment means, a payment date, business branch information, and a final payment approval number.

8. The bonus accumulation method of claim 6, wherein the bonus type includes at least one selected from a group comprising points, mileages, electronic coupons, electronic stamps, electronic lotteries, electronic appreciation coupons, and event winning tickets; and wherein the application criterion includes at least one selected from a group comprising a final payment amount, a payment means, a degree of the user, a bonus accumulation region, a bonus accumulation scale, a bonus accumulation time, and a bonus accumulation order.

9. An Internet of Data-Near Field Communication (IoD-NFC) terminal device installed in a business branch and physically separated from a payment terminal device except for a physical serial connection with a serial communication module of the payment terminal device and that is configured to communicate with a physically separated user terminal device through near field communication (NFC) based on Internet of Data (IoD), the IoD-NFC terminal device comprising:

a data transmitting/receiving unit configured to:
directly receive final payment approval data from the serial communication module of the payment terminal device; and
transmit available bonus data to the payment terminal device during a bonus exchange operation;

a user identifying unit configured to:
identify user information of the user terminal device through NFC with the user terminal device, the user information including an identification number of the user terminal device;
determine whether a bonus application dedicated to a bonus server is installed in the user terminal device;
determine whether the bonus application is not in a log-in state; and
determine whether a user of the user terminal device subscribes to the bonus server based on the identification number;

a bonus setting unit configured to store a predetermined bonus type and an application criteria;

a bonus calculating unit configured to:
internally calculate bonus data directly from the received final payment approval data based on the predetermined bonus type and application criteria received from the bonus setting unit, and only on the identification number of the user terminal device when it is determined that the user does not subscribe to the bonus server and that the bonus application is not in a log-in state; and
internally calculate bonus data directly from received final payment approval data based on the predetermined bonus type and application criteria received from the bonus setting unit, and on the identification number of the user terminal device and user information stored in the bonus server by automatically aggregating newly calculated bonus data with the user information data stored in the bonus server when it is determined that the user subscribes to the bonus server and when it is determined that the bonus application is in a log-in state;

a bonus storing and transmitting/receiving unit configured to:
store the directly calculated bonus data from the bonus calculating unit; and
wirelessly transmit the directly calculated bonus data to the user terminal device through NFC;
wirelessly receive the available bonus data from the user terminal device through NFC during a bonus exchange operation; wherein
the data transmitting/receiving unit is configured to communicate with a bonus server which receives a request for an approval of the bonus data from the user terminal device and approves the bonus data and aggregates, deducts, and stores the bonus data,
the serial communication module is configured to transmit the final payment approval data indicating completion of a final payment approval of a credit card or verification of cash receipt at the payment terminal device, and wherein the bonus exchange operation is initiated by the user terminal device wirelessly transmitting the available bonus data through NFC contacting to the IoD-NFC terminal device while the bonus application is in a log-in state, and further comprises the payment terminal device transmitting a request for a bonus exchange approval to the bonus server over an added value communication network based on the received available bonus data in a same manner as a method for transmitting a transaction approval request of a commercial transaction to a payment approval company, the bonus server determining to approve the bonus exchange, and the bonus server transmitting a bonus exchange approval to the payment terminal device over the added value communication network in a same manner as a method for receiving an approval confirmation of a commercial transaction from a payment approval company.

10. The IoD-NFC terminal device of claim 9, wherein the final payment approval data comprises a payment amount, a payment means, a payment date, business branch information, and a final payment approval number.

11. The IoD-NFC terminal device of claim 9, wherein the bonus type includes at least one selected from a group comprising pints, mileages, electronic coupons, electronic stamps, electronic lotteries, electronic appreciation coupons, and event winning tickets; and wherein the application criterion includes at least one selected from a group comprising a final payment amount, a payment means, a degree of the user, a bonus accumulation region, a bonus accumulation scale, a bonus accumulation time, and a bonus accumulation order.

12. The IoD-NFC terminal device of claim 9, further comprising:

an alarm module configured to announce that the directly calculated bonus data is transmitted or announce a calculation amount of the directly calculated bonus data through an acoustic device or a monitor after transmitting the directly calculated bonus data.

* * * * *